United States Patent [19]

Tesch

[11] 4,047,327

[45] Sept. 13, 1977

[54] GROUND COVERING MATERIAL

[75] Inventor: Gunter H. Tesch, Fribourg, Switzerland

[73] Assignee: Breveteam S.A., Fribourg, Switzerland

[21] Appl. No.: 726,228

[22] Filed: Sept. 24, 1976

[30] Foreign Application Priority Data

Sept. 26, 1975 Switzerland ................ 12557/75

[51] Int. Cl.² ........................................ A01G 7/00
[52] U.S. Cl. ................................................... 47/9
[58] Field of Search ................................ 47/9, 58, 32

[56] References Cited

U.S. PATENT DOCUMENTS

| | | | |
|---|---|---|---|
| 1,553,035 | 9/1925 | Eckart | 47/9 |
| 1,930,939 | 10/1933 | Horner | 47/9 |
| 3,252,250 | 5/1966 | Lemaire | 47/9 |
| 3,805,446 | 4/1974 | Aoyagi | 47/9 |
| 3,810,328 | 5/1974 | Bryan et al. | 47/9 |
| 3,839,139 | 10/1974 | Ito et al. | 47/9 X |
| 3,955,319 | 5/1976 | Smith | 47/9 |
| 3,975,859 | 8/1976 | Muller | 47/9 X |

Primary Examiner—Robert E. Bagwill
Attorney, Agent, or Firm—Bacon & Thomas

[57] ABSTRACT

A vegetation suppressing, ground covering agronomic mulch sheet adapted for the prevention and/or control of undesirable plant growth is disclosed. The sheet is comprised of a web having a maximum light transmittance of about 60% and a minimum air permeability of about 200 1/m²s at a pressure differential of 10 mm water.

5 Claims, No Drawings

GROUND COVERING MATERIAL

BACKGROUND OF THE INVENTION

1. Field of the Invention

The present invention pertains generally to agronomic mulch sheets for covering an area of soil or earth to aid in the retention of moisture and heat therein. More particularly, the present invention relates to such agronomic mulch sheets adapted to control or suppress the growth of vegetation in an area of ground upon which the sheet is placed, which control and suppression is derived from a design combining features of selective light transmittance and air permeability.

2. Description of the Prior Art

It is known in the prior art to cover agricultural or tillage areas with, for example, a plastic film for various and diverse purposes. Accordingly, differing varieties of mulch sheets have been employed in connection with the growing of fruits and vegetables, and coffee and cocoa beans. Without limitation, the advantages which may be realized include earlier harvesting, higher surface yields, suppression of weeds and other undesirable growth, higher ground temperature beneath the mulch, higher ground moisture with regular irrigation, lower irrigation requirements, and the prevention or reduction of erosion by wind and rain. Concomitantly, there are known disadvantages such as, for example, the difficulty of supplying irrigating water to the ground which results in a depletion of retained moisture whereby the soil gradually dries out, accumulation of heat under the film, exclusion of air, collection of gases which originate from fermentation in the ground or which are given off by various organic fertilizers (e.g., manure) and which, at higher temperatures, adversely affect plant growth and maturation. No conventional or commercially available agronomic mulch sheet currently exists to maximize the advantages of its use while simultaneously minimizing the drawbacks, or one which even balances these competing interests in a successful manner.

Numerous approaches have been taken in an attempt to achieve this desirable result. For example, various known mulch sheets have been formed with flap-like incisions in the sheet through which rain water or irrigating water may pass into the ground. However, it has been found in practice that after a relatively short amount of time weeds or other undesirable vegetation may grow through these incisions which, actually, magnifies the problem sought to be prevented since weed control is then further complicated by the presence of the mulch sheet. Additionally, the prior art mulch sheets have failed to recognize the importance of proper dimensioning of both the flap-like incisions and spacings therebetween. Thus, such sheets, typically fabricated with rather large dimensions of both the incision and distance between adjacent incisions, fail to insure sufficient exchange of gas between the ground and the surrounding air and, likewise, fail to prevent local accumulations of heat. Note, for example, the U.S. Pat. Nos. 3,805,446, 3,580,196, and 3,559,599. Other exemplary references will be found among those cited against U.S. Pat. No. 3,975,859 assigned to the assignee herein, which patent is incorporated herein by reference and relied upon. Similar problems have obtained with perforated films having incisions on the order of 10 mm, typical for use in film tunnels.

Additionally, the prior art recognizes such mulching films formed of plastic to which is added pigmentation (e.g., black pigment). Notwithstanding the use of such mulching sheets, the prior art has failed to recognize that the control or suppression of the growth of vegetation may be effectively achieved by proper control of the degree of pigmentation. Accordingly, typically-available black mulching sheets have been found to absorb a great amount of heat, thus providing very high temperatures locally beneath the film but fostering significantly lower ground temperatures beyond the fairly small local zone. Consequently, these mulch sheets are ineffective for selective control.

Nowhere does the prior art recognize the combined consideration of light transmittance and air permeability. Therefore, the need exists to provide an agronomic mulching sheet which properly balances all of the foregoing considerations and, thus, may be utilized to curb the growth of undesirable weeds or other vegetation in an efficient, simple, and economic manner.

SUMMARY OF THE INVENTION

It is, therefore, a primary object of the present invention to provide an agronomic mulch sheet which efficiently balances the aforenoted advantages and disadvantages attendant the use of such webs.

It is also a primary object of the present invention to provide an agronomic mulch sheet which is effective to control or entirely suppress the growth and/or maturation of undesirable plant growth in an area of ground over which the mulch sheet is placed.

It is a further object of the present invention to provide an agronomic mulch sheet which may be tailored with respect to both light transmittance and air permeability whereby the effectiveness of such sheets is extended over a broad range of applications.

It is still a further object of the present invention to provide a plastic film mulch sheet having a plurality of incisions therein, the dimension of both individual incisions and distances between successive incisions in perpendicular directions being provided to permit proper exchange of moisture and gas between the ambient and the area of ground over which the mulch sheet is placed.

Yet a further object of the present invention is to provide an agronomic mulch sheet fabricated as a fibrous web exhibiting a specific light transmittance and air permeability whereby the aforenoted advantages and disadvantages of prior art mulch webs are efficiently balanced.

It is still a further object of the present invention to provide an agronomic mulch sheet having a maximum light transmittance of about 60% and a minimum air permeability of about 200 $l/m^2s$ at a pressure difference of 10 mm water.

Yet other objects and advantages of the present invention will become apparent to the skilled artisan upon examination of the detailed description of the invention and exemplary embodiments described therein.

In accordance with the present invention, it has been determined that the proper balancing of the light transmittance and air permeability of agronomic mulch sheets effectively maximizes the advantages of earlier harvesting, higher surface yields, suppression of undesirable vegetation, higher ground temperatures, higher ground moisture with regular irrigation, lower irrigation requirements, and the prevention of erosion by wind and rain, while simultaneously minimizing the disadvantages of difficulty in supplying water to the ground, undesirable accumulation of heat beneath the web, exclusion of air, and collection of gases, heretofore prevelant in prior art mulch sheets. Specifically, it has been determined that a mulch sheet possessing a maximum light transmittance of about 60% and a minimum air permeability of about 200 $l/m^2s$ at a pressure difference of 10 mm water properly accounts for the optimum balance of advantages and disadvantages noted above.

The agronomic mulch sheet of the present invention may be fabricated either as a plastic film with appropriate pigmentation in specific ranges, which film is slit in a precise manner. Alternatively, the mulch sheet may be fabricated from fibrous materials incorporating an effective amount of pigmented fibers and suitably compressed to achieve the desired air permeability value. As a further alternative, the fibrous sheet may be combined with the plastic film as a unitary mulch sheet.

DETAILED DESCRIPTION OF THE INVENTION

While it is well known to employ agronomic mulch sheets of various configurations and forms to aid in diverse horticultural endeavors, prior art attempts to fashion such mulch sheets for the efficient suppression or control of the growth of unwanted vegetation have not been entirely successful. Notably, there has not been provided by prior art teachings a web which recognizes the importance of the combination of light transmittance and air permeability and the manner in which control of these qualities affects the desired result. The present invention is expressly directed to providing such a web.

In order to more fully elucidate upon the objects and advantages of the present invention, the following preferred embodiments thereof will be given, the same intended to be illustrative and in no wise limitative.

A common problem in agriculture is the control of the environment surrounding crops or other flora under tillage. The U.S. Pat. No. 3,975,859, assigned to the present assignee, provides an exceptionally effective method for the horticultural protection of crops and the like in the immediate environment thereof. However, while the invention described and claimed therein is exceedingly effective for use along, for example, a row of crops, it does not entirely take into account the similar sort of control necessary between successive rows in an area under tillage to suppress or prevent the growth of undesirable vegetation. The web of the present invention is particularly adapted to these ends; albeit, it is equally suitable for use in any area where it is desired to control or suppress the growth of such unwanted vegetation.

Essentially, the present invention embraces an agronomic mulch sheet of either a suitable polymeric material or of fibrous construction which has been appropriately pigmented to provide a specific range of light transmittance. Optimally, the web or sheet is fabricated to have a maximum light transmittance of about 60%. Similarly, the mulch sheet is fabricated to provide a fairly precise amount of air permeability, at least 200 $l/m^2S$ at a pressure differential of 10 mm water across the web. This air permeability is provided in the polymeric sheet by a precisely controlled slitting operation or in the fibrous sheet by control of, for example, the degree of compression during fabrication.

Many uses for this invention are envisioned from the aforenoted control of weeds or unwanted vegetation between successive rows of crops under cultivation, the protection of tillage areas between harvest and planting times, the enhancement of naturally occuring chemical reactions in the composting of refuse, and the like. Obviously, also, the agronomic mulch sheet of the present invention is useful for the prevention of erosion due to wind and rain.

To provide the desired effect of suppression or control of unwanted vegetation, the agronomic mulch sheet according to the present invention is fabricated to have a reduced degree of light permeability. When a polymeric film is employed, such as polyethylene, various known pigments may be used. Particularly suitable is soot, although any equivalent form of carbon or carbon black may be employed, in percentages derivable by the skilled artisan to perform the desired function. The required amount of soot will, of course, depend upon the type and thickness of the plastic film utilized. For example, for a high density polyethylene film of 0.06 mm in thickness, a preferred film for the present invention, the addition of from about 2 to 2.5 weight percent is required in order to sufficiently restrict passage of sunlight to the extent that plants or vegetation beneath the web are no longer able to photosynthesize. This corresponds approximately to mulch sheets described in the prior art as "black films".

While the black films have an absolute vegetation-checking effect, they have a corresponding disadvantage in that the web itself absorbs too much heat thus lowering the temperature of the earth beneath the web to a level significantly less than that experienced in connection with transparent films. For a weed-preventing effect, a smoky-grey coloration has been found desirable, and is achieved for a 0.06 mm polyethylene film by an addition of soot in the range of from about 0.82 to 1.2% by weight. This effect is, of course, dependent upon the variety of weed or vegetation as well as the geographical location (i.e., position of the sun) and other climatic factors.

The various degrees of effectiveness in control and suppression of the growth of vegetation may be demonstrated by laying various films exhibiting different degrees of light transmittance on an area sown with grass. Allowing these simulated mulch films to remain in place after twenty days, it was determined that a soot content of more than 2% by weight for a high density polyethylene film of 0.06 mm in thickness effected irreversible suppression of the vegetation in that all the grass died. Those films having a soot content of about 0.2% by weight, however, provided only suppression of the vegetation. Normally, such mulch films will be layed on freshly worked ground not yet covered with plant growth, however, the results indicate a variance in vegetation control directly correlatable to the light transmittance of the film.

When the polymeric film of, for example, polyethylene is employed it is desirable, if not necessary, to appropriately slit the web to allow appropriate transfer of gases above and beneath the plane of the mulch sheet. Since these slits will also permit some light to be transmitted through the web, in order to obtain an equivalent vegetation suppressing effect a slightly higher degree of blackness is required. This a demonstrated by experiments with films of 0.06 mm of high density polyethylene having 2% by weight soot addition. Vegetation beneath a film which has not been slit was found to have completely died after a 20 day period while vegetation beneath a film slit in accordance with the present invention was significantly suppressed; however, it remained alive.

As noted above, in combination with the control of light transmittance, a control of the air permeability of the agronomic mulch sheets of the present invention is necessary. Thus, the polymeric films employed in the present invention are provided with a plurality of straight slits specifically arranged uniformly across the sheet in parallel rows wherein individual slits in a given row are opposite slits of identical dimensions in adjacent rows; i.e., slits in adjacent rows are not displaced or otherwise staggered. The bridge pieces between slits thus form a network of essentially orthogonal strips across the entire surface of the film. This arrangement has the advantage of insuring substantially complete closure of individual slits even should the film be stretched laterally as opposed to a staggered arrangement of slits which would open in the event of transverse forces.

In determining the absolute dimensions most effective for the suppression or control of the growth of unwanted vegetation, it has been determined that a slit dimension of about 20 cm in length, corresponding to about 200 slits per square meter, allows grass to grow through the web or sheet without trouble. Reducing the slit size to about 8.3 mm in length, corresponding to about 1,800 slits per square meter, results in an observation that only individual shoots will grow through the sheet. Further reduction of slit length to about 4 mm in length, corresponding to about 18,000 slits per square meter, results in complete prevention of growth through the web.

Accordingly, it has been determined that, for normally encountered weeds and unwanted vegetation, a slit length on the order of about 4 to 6 mm corresponding to about 18,000 to 10,000 slits p. sq. m. is most preferred, while a maximum length of about 12 mm corresponding to about 4,000 slits p. sq. meter is found useable. This range, nonetheless, is dependent upon the type of weeds which are encountered within a certain cultivation area and, accordingly, the optimum slit length depends upon actual cultivation conditions. However, determination of the appropriate dimension is well within the skill of the routineer or skilled artisan.

The utilization of a dense pattern of slits as described above has several distinct advantages. The slitting insures a permeability to rain and/or irrigation water while preventing erosion effects typically encountered in agricultural fields. Evaporation of the moisture in the ground beneath the web is reduced but without producing an accumulation of heat as is experienced with numerous prior art agronomic mulch sheets. In fact, because the web is slit rather than cut (i.e., no material is removed in the slitting operation) the slits will act as "one-way valves". That is, there is a pronounced tendency for opposing edges of the slit to curl slightly and partially seal the slit either upwardly or downwardly relative to the plane of the web. Thus, as water falls upon the web its weight will effect a downward displacement of adjacent edges of the slit and allow the water to gradually drip through the web. Contrariwise, as heat begins to evaporate the moisture within the ground, the slight pressure which accompanies evaporation will cause the edges to curl upwardly and permit the evaporated moisture to pass through the web.

While it is thus observed that both water and gas may pass substantially freely through the mulch web, weeds or other undesirable vegetation cannot protrude through the rather small dimensions of individual slits. Moreover, air-borne seeds cannot pass through the slits thus further enhancing the effectiveness of the present mulch sheet.

Another problem encountered in utilizing prior art mulches which has been overcome by the present invention resides in application of these sheets to soils which exhibit high concentrations in various salts (common salt, saltpeter, and the like). With such salt-containing soils, the accumulation of salt on the surface, which is harmful to the maturation of plants, is obviated inasmuch as the salts are dissolved and either returned to the soil or washed away by the action of water passing through the mulch sheet. The other aforenoted advantages obtained by the use of such mulch sheets are likewise enhanced.

A mulch sheet according to the present invention may be employed to cover or otherwise protect the ground between two culture periods when there will be a time period therebetween, such as between the working of the ground after harvesting and a subsequent planting during which time weed seeds and the like would be carried by the wind and grow were the ground left uncovered. Other advantages during this period may likewise be realized.

Although the mulching sheet of the present invention provides a reduced air permeability, the surface of the ground can yet receive sufficient air for regeneration of the culture layer. Therefore, while the mulch sheet will exercise in a weed suppressing, if not weed destroying, effect, it does not prevent the activity of microorganisms which are important for the formation of humus. Further, because the surface of the earth is maintained in a relatively moist condition earth worms and other beneficial insects are provided with highly favorably conditions. The heat decomposition of plant residue due to aerobic bacteria is similarly not prevented but, indeed, may be increased because of a marked degree of shielding from germ-destroying light rays.

Similar advantages may be realized in the composting of garden and kitchen refuse. Accordingly, such wastes may be spread across surface of the soil and covered with a mulch sheet according to the present invention which will prevent the refuse from drying out due to wind and sun. Moreover, there may be used an alternate embodiment of the present invention which utilizes a fibrous web such as spun-fleece and the like, which is designed to insure the proper degrees of light transmittance and air permeability.

The alternate embodiment of, for example, spun-fleece is prepared in known manner and the light absorbtion properties modified by admixing black colored fibers with the fibrous material, while the air permeability can be modified by appropriate bonding of the fibers as is known. By suitable choice of the thickness of the material, the density of the fibers, and the proportion of pigmented or colored fibers, it is possible to appropriately tailor these considerations.

Such webs are particularly useful in the composting of waste materials due to the additional advantage provided by the inherency for the mulch sheet to store moisture. Should the air permeability of these fibrous mulch sheets by insufficient, they too may be slit. Moreover, it is possible to employ a combination of the polymeric film and fibrous or fleece layer by needling the latter through the former whereby the greater integrity of the film is combined with the advantage of moisture retention of the fleece for enhanced effectiveness.

While the invention has now been described in terms of certain preferred embodiments, the skilled artisan will appreciate that various modifications, substitutions, additions, and deletions may be made without departing from the spirit thereof. Accordingly, it is intended that the scope of the invention be limited solely by that of the following claims.

What is claimed is:

1. A vegetation suppressing, ground covering agronomic mulch sheet comprising a polymeric film having a light-absorbing effective quantity of pigmentation to provide a maximum light transmittance of about 60%; said film being slit in a pattern wherein slits having a length in the range of from about 4 mm to about 12 mm are arranged substantially uniformly in a plurality of rows, and wherein individual slits in a given row are opposite slits of identical dimension in adjacent rows; whereby there are provided a minimum slit density of at least 1,000 slits per square meter and a minimum air permeability of about 200 l/m²s at a pressure differential of about 10 mm water across the plane of the sheet.

2. The vegetation suppressing, ground covering agronomic mulch sheet of claim 1, wherein said slits have a length in the range of from about 4 mm to about 8 mm.

3. The mulch sheet of claim 1, wherein said web is a polymeric film of high density polyethylene pigmented with a light-absorbing effective amount of soot.

4. The mulch sheet of claim 3, wherein said web is about 0.06 mm in thickness, and wherein said soot is present in an amount of from about 0.2% to about 2.5% by weight.

5. A method for controlling and/or suppressing the growth of vegetation comprising the step of covering an area of ground with the mulch sheet of claim 1.

* * * * *